INVENTORS
C. R. DEIBERT
F. T. TURNER
R. H. SNIDER
BY
M. Reynolds
ATTORNEY

INVENTORS
C. R. DEIBERT
F. T. TURNER
R. H. SNIDER
BY
M. J. Reynolds
ATTORNEY

Jan. 25, 1955 C. R. DEIBERT ET AL 2,700,701
FACSIMILE RECEIVING APPARATUS
Filed Dec. 13, 1951 7 Sheets-Sheet 3

INVENTORS
C. R. DEIBERT
F. T. TURNER
R. H. SNIDER
BY
M. J. Reynolds
ATTORNEY

Jan. 25, 1955 C. R. DEIBERT ET AL 2,700,701

FACSIMILE RECEIVING APPARATUS

Filed Dec. 13, 1951 7 Sheets-Sheet 4

INVENTORS
C. R. DEIBERT
F. T. TURNER
R. H. SNIDER

BY

ATTORNEY

Jan. 25, 1955 C. R. DEIBERT ET AL 2,700,701

FACSIMILE RECEIVING APPARATUS

Filed Dec. 13, 1951 7 Sheets-Sheet 5

INVENTORS
C. R. DEIBERT
F. T. TURNER
R. H. SNIDER

BY

ATTORNEY

INVENTORS
C. R. DEIBERT
F. T. TURNER
R. H. SNIDER
BY
[signature]
ATTORNEY

INVENTORS
C. R. DEIBERT
F. T. TURNER
R. H. SNIDER
BY
M. J. Reynolds
ATTORNEY

United States Patent Office 2,700,701

Patented Jan. 25, 1955

2,700,701

FACSIMILE RECEIVING APPARATUS

Clarence R. Deibert, Water Mill, Frank T. Turner, Hampton Bays, and Robert H. Snider, Southampton, N. Y., assignors to The Western Union Telegraph Company, New York, N. Y., a corporation of New York Application December 13, 1951, Serial No. 261,462

18 Claims. (Cl. 178—6.6)

The present invention relates to telegraphic communication by facsimile and more particularly to the recording of relatively high speed facsimile signals.

In facsimile communication it is necessary properly to phase the associated transmitter and recorder, and it is desirable that phasing, which is normally accomplished through trial and error means, be achieved as rapidly as possible. This latter consideration is of particular importance at high transmission speeds. When operating a high speed facsimile system over a one-way circuit, phasing must be accomplished within a predetermined time interval. In such a system, rapidity and reliability of phasing are joint considerations.

To achieve maximum efficiency in the use of a communication channel for high speed facsimile, it is desirable that substantially continuous transmission be provided. For this purpose, a transmitting station may conveniently be provided with a plurality of transmitters, thus eliminating the delay normally experienced in loading a transmitter. A facsimile recorder, suitable for operation in a system of this type, must be provided with reliable and fast acting control apparatus.

In accordance with the foregoing, it is an object of the invention to provide an improved facsimile receiver and associated control apparatus suitable for use at high signaling speeds.

Another object of the invention is to provide a novel arrangement for rapid and reliable phasing of a high speed facsimile recorder.

Still another object of the invention is to provide a relay system for controlling a high speed facsimile recorder together with its associated apparatus.

Further objects of the invention will appear from the following description.

In accordance with the invention, these objects are achieved by providing a facsimile receiver in which locally generated phasing impulses are given a variant time relationship with respect to received phasing impulses, under control of a transmitted signal, the variance being terminated when proper phasing is achieved as indicated by coincidence of a pair of phasing impulses. In addition, apparatus is provided for controlling the facsimile receiver in accordance with received signals.

The invention will now be described in greater detail with reference to the appended drawing in which.

Figures 1, 8:
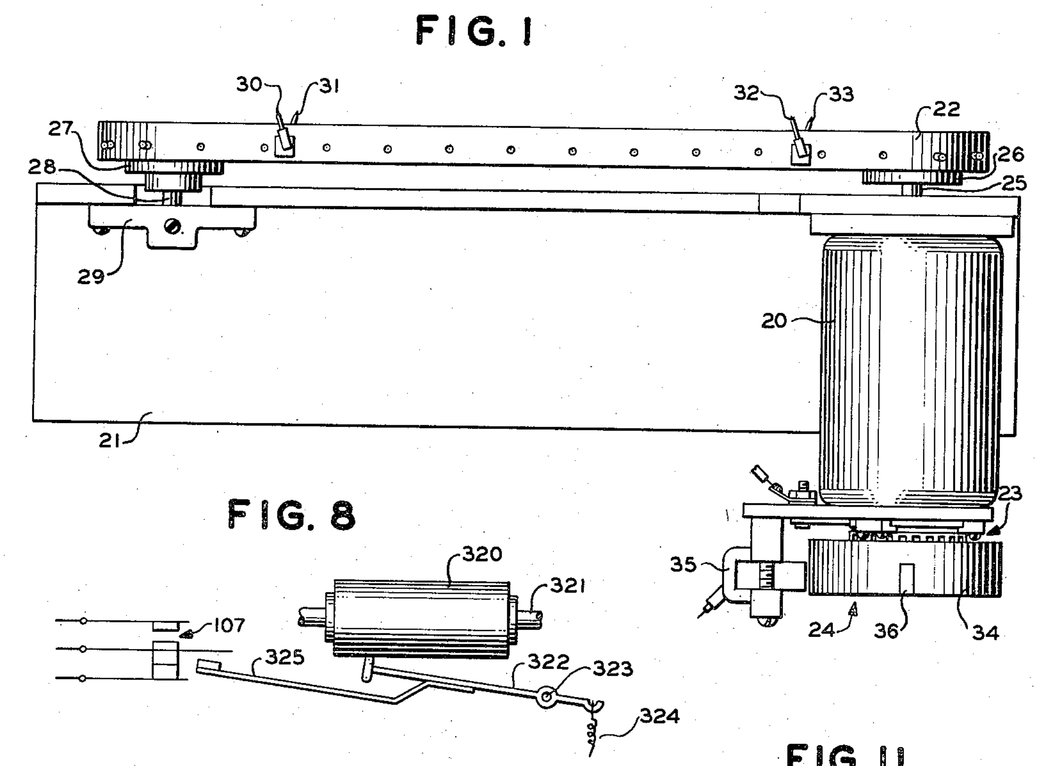
Fig. 1 illustrates a portion of the mechanical arrangement of a facsimile recorder in accordance with the invention.
Figs. 8 through 10 illustrate diagrammatically suitable mechanical relationships for certain of the elements of Fig. 7.

Referring now to the drawing and more particularly to Fig. 1, an electric motor 20 mounted on a bed 21 is arranged to drive a stylus belt 22, a tone generator 23 and the rotating member of an impulse generator 24. Stylus belt 22 is driven by motor 20 through a shaft 25 and a toothed pulley 26. The end of belt 22 remote from motor 20 is carried on a toothed pulley 27 rotating with a shaft 28. Shaft 28 is carried by a bearing member 29.

Stylus belt 22 carries four styluses 30, 31, 32 and 33 suitably disposed for successively marking a recording copy sheet. If the transmitter comprises a transparent message drum as illustrated in the copending patent application of L. G. Pollard et al., Serial No. 261,461, filed concurrently herewith, the distance between adjacent styluses should be equal to the internal circumference of the message drum. The copy sheet and platen are not shown in Fig. 1.

Tone generator 23 forms part of a motor stabilization circuit fully described in the copending patent application of F. T. Turner et al., Serial No. 245,544, filed September 7, 1951. This motor stabilization circuit serves accurately to control rotation of the electric motor rotor thereby minimizing defects in the recorded copy produced by fluctuations in motor line voltage, load or bearing friction.

Impulse generator 24 comprises a rotating member 34 carried on the shaft of motor 20 and an electrical impulse coil 35 arranged adjacent to member 34. A magnet 36 is carried in a slot of member 34 and is so arranged as to induce a voltage pulse in coil 35 once each revolution of member 34.

Figure 2:
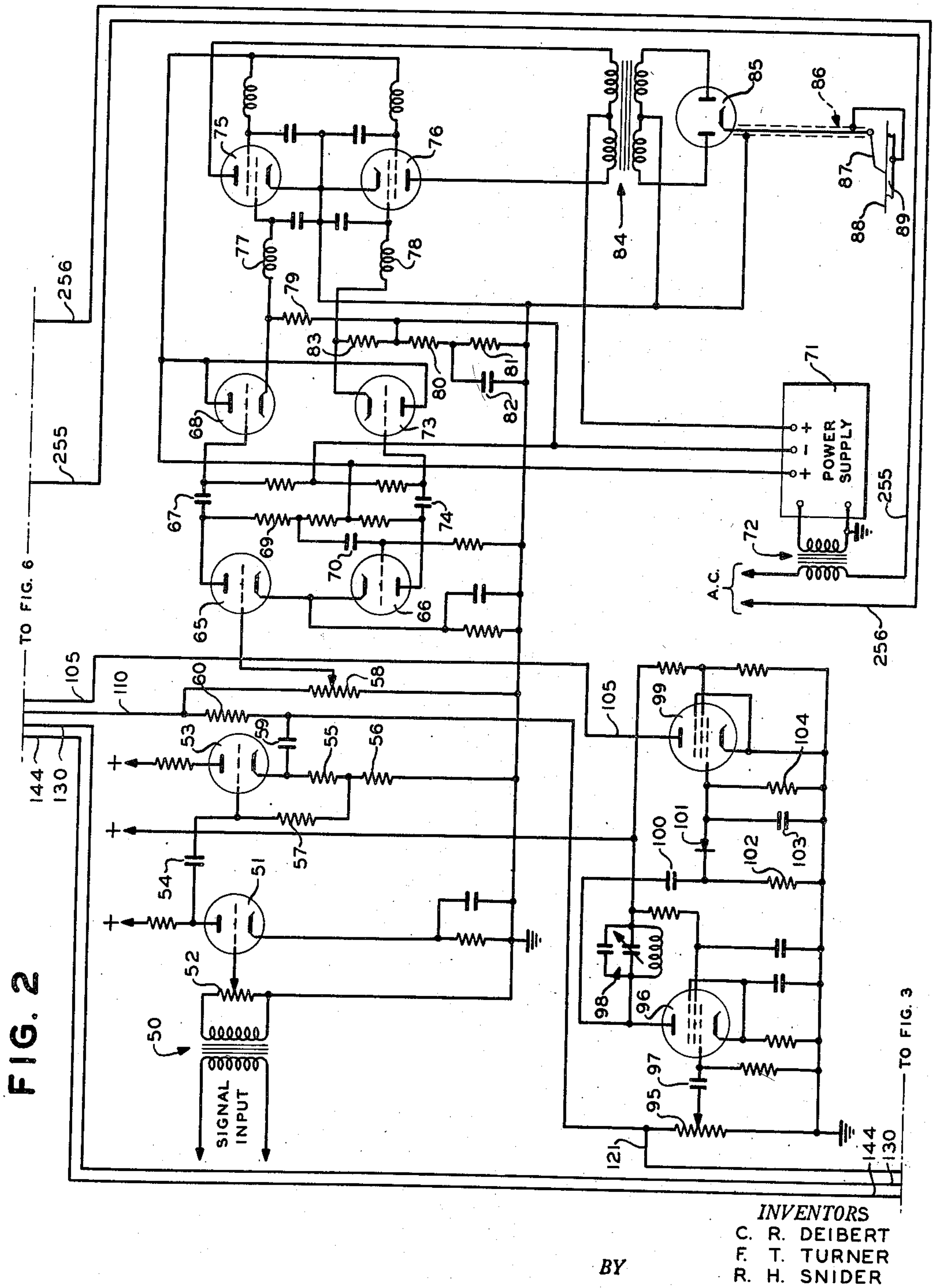
Figs. 2 through 7 illustrate in detail a facsimile recorder circuit arrangement in accordance with the invention.

Referring now to Fig. 2, the incoming signals are applied to the primary winding of an input transformer 50. The signals applied to transformer 50 might be derived from a radio receiver, a wire line or other communication channel. The incoming signals may comprise a facsimile message signal, a phasing wave, an end-of-message tone and a standby tone. The particular form of these signals is not critical as the invention may be employed with a wide variety of signals. For purposes of illustration only, the invention will be described in connection with signals of the type generated in the transmitter described in the copending patent application of L. G. Pollard et al., referred to hereinbefore. It is to be understood that the frequencies and wave shapes described hereinafted are given solely for purposes of illustration and are not to be considered as limiting the scope of the invention.

As described in the said patent application of L. G. Pollard et al., at the start of transmission a standby signal comprising a 12.5 kc. tone is applied to the line. After insertion of a message blank in the transmitter, the standby signal is switched off and transmission of the phasing signal begins. The phasing signal comprises a 25 kc. wave modulated by a 30 cycle rectangular phasing pulse. Transmission of the phasing signal continues for a predetermined time interval such as 2.5 seconds. Upon completion of the phasing interval, facsimile signal transmission commences, the facsimile signal comprising a modulated 25 kc. wave. At the end of the message, a 12.5 kc. end-of-message signal is transmitted for a very short interval. If transmission is to continue immediately the end-of-message signal is followed by a phasing signal. If transmission is to be suspended, the end-of-message tone is continued as a standby signal.

Each of the signals is applied to the control grid of an amplifier tube 51 through a potentiometer 52 shunted across the secondary winding of transformer 50. The anode of tube 51 is coupled to the control grid of a tube 53 through a coupling capacitor 54. Tube 53 is connected as a cathode follower, the cathode thereof being coupled to ground through two series connected load resistors 55 and 56. The control grid of tube 53 is coupled to the junction of resistors 55 and 56 through a resistor 57. The cathode of tube 53 is coupled to the high side of a potentiometer 58 through a coupling capacitor 59 and a resistor 60. The other end of potentiometer 58 is coupled to ground. The end of capacitor 59 remote from the cathode of tube 53 is the point in the circuit at which the various signals diverge. The different signals will now be traced through their respective circuits.

The facsimile intelligence signal appearing across potentiometer 58 is applied to the control grid of an amplifier tube 65 which, together with a tube 66, forms a phase inverting amplifier. The output of tube 65 is applied through a coupling capacitor 67 to the control grid of a tube 68 and, through a resistor 69 and a capacitor 70, to the control grid of tube 66. Anode operating voltage for tubes 65 and 66 are derived from the left hand terminal of recording amplifier power supply 71. The power input for supply 71 is derived from the A. C. mains through a transformer 72.

The facsimile signal appearing at the anode of tube 66, which is substantially in phase opposition to the signal appearing at the anode of tube 65, is applied to the control grid of a tube 73 through a coupling capacitor 74. Tubes 68 and 73 form a cathode follower type driver stage for a push-pull power amplifier stage comprising a pair of tubes 75 and 76. For this purpose, the anodes of tubes 68 and 73 are connected to the left hand terminal of supply 71 and the cathodes of tubes 68 and 73 are coupled, respectively, to the respective control grids of tubes 75 and 76 through inductors 77 and 78, respectively.

The cathode of tube 68 is coupled to ground through a load impedance comprising a resistor 79, a resistor 80 and the parallel combination of a resistor 81 and a bypass capacitor 82. The cathode of tube 73 is coupled to ground through a load impedance comprising a resistor 83, resistor 80 and the parallel combination of resistor 81 and capacitor 82. The junction of resistors 79 and 83 is coupled to the negative output terminal of supply 71 so that the bias voltages appearing at the control grids of tubes 75 and 76 is determined in part by the voltage drop across resistors 79 and 83, respectively, and in part by the negative supply potential. It should be noted that the negative supply potential is applied to the cathodes and control grids of tubes 68 and 73. Accordingly, the bias on tubes 68 and 73 will be determined primarily by the voltage drop across resistors 79 and 83, respectively, and resistor 81.

The anodes of tubes 75 and 76 are connected respectively to opposite terminals of the primary winding of a transformer 84. The center tap of the primary winding of transformer 84 is connected to the right hand output terminal of supply 71, thereby applying a high D. C. operating potential to the anodes of tubes 75 and 76. The ends of the secondary winding of transformer 84 are connected to the respective anodes of a full wave rectifier tube 85. The center tap of the secondary winding of transformer 84 is grounded. The cathode of tube 85 is connected through the center conductor of a shielded cable 86 to an electric stylus 87. Stylus 87 corresponds to styluses 30 through 33 of Fig. 1. It is evident that the rectified facsimile signal is applied to stylus 87 with positive potential. Stylus 87 is arranged to scan a recording copy sheet 88 supported by a platen 89. Platen 89, and its associated platen motor, to be described hereinafter, serve to maintain the proper stylus pressure on the copy sheet. Platen 89 and the shielding of cable 86 are grounded.

In a preferred embodiment of the invention, tubes 75 and 76 were realized as type 807 power amplifier tubes operated so as to provide a maximum undistorted power output of approximately 60 watts. Approximately half of this power was sufficient for satisfactory recording on a dry electrosensitive recording paper with a stylus speed of 240 linear inches per second.

The end of message signal and the standby signal, developed at the cathode of tube 53, which signals are identical except as to duration, are applied to a potentiometer 95 through capacitor 59. These signals, in the example assumed, are 12.5 kc. sine waves. The end of message signal has a short duration which may be as little as several milliseconds. The duration of the standby signal is indefinite, depending upon loading of the transmitters.

The signal developed across potentiometer 95 is applied to the control grid of a pentode amplifier tube 96 through a capacitor 97. The anode circuit impedance of tube 96 comprises a parallel resonant circuit 98 sharply tuned to 12.5 kc. The output of tube 96, which comprises substantially solely the 12.5 kc. signal, is applied to the control grid of a pentode amplifier tube 99 through a capacitor 100 and a rectifier 101. The junction of capacitor 100 and rectifier 101 is coupled to ground through a resistor 102. The control grid of tube 99 is coupled to ground through the parallel combination of a capacitor 103 and a resistor 104.

The cathode of tube 99 is maintained at ground potential so that, in the absence of an input signal, tube 99 conducts strongly. Rectifier 101 is so poled that, when the 12.5 kc. signal is applied thereto, the control grid of tube 99 will become negative, thereby substantially reducing the anode current flow of tube 99. Tube 99 is supplied with a positive anode potential through a circuit extending from the anode of tube 99 through a conductor 105, the winding of end-of-message detector relay EMD on Fig. 6, a conductor 106, the back contact and tongue of a low paper switch 107 on Fig. 7, a conductor 108 and a conductor 109 to the positive D. C. terminal on Fig. 6.

In the absence of a 12.5 kc. signal, the anode current of tube 99 is sufficient to maintain relay EMD energized. However, when a 12.5 kc. signal is received, the anode current of tube 99 drops sufficiently to release relay EMD. The function of relay EMD will be discussed more fully hereinafter in connection with Figs. 6 and 7. However, it should be noted at this that the signal input to tube 65 is grounded at the high side of potentiometer 58 when a 12.5 kc. signal is received so that this signal does not cause marking of recording copy sheet 88. This ground connection extends from the junction of potentiometer 58 and resistor 60 through a conductor 110, a back contact of relay EMD, a conductor 111, and a conductor 112 to ground. Energization of relay EMD breaks this ground circuit permitting application of the facsimile signal to tube 65. Resistor 60, interposed between ground and capacitor 59, prevents grounding of the 12.5 kc. signal when relay EMD is deenergized.

The phasing signal, as received at the signal input terminals of transformer 50, consists of a 25 kc. sine wave carrier modulated by a 30 cycle rectangular wave. This phasing signal, which appears at the cathode of tube 53, is applied to the control grid of an amplifier tube 120, shown in Fig. 3, through capacitor 59, a conductor 121, a rectifier 122, a potentiometer 123 and a capacitor 124. The phasing signal is demodulated by rectifier 122 and appears at the control grid of tube 120 as a train of positive going rectangular pulses having a frequency of 30 cycles. A capacitor 125 shunts potentiometer 123 in order to suppress the 25 kc. carrier.

Figure 3:
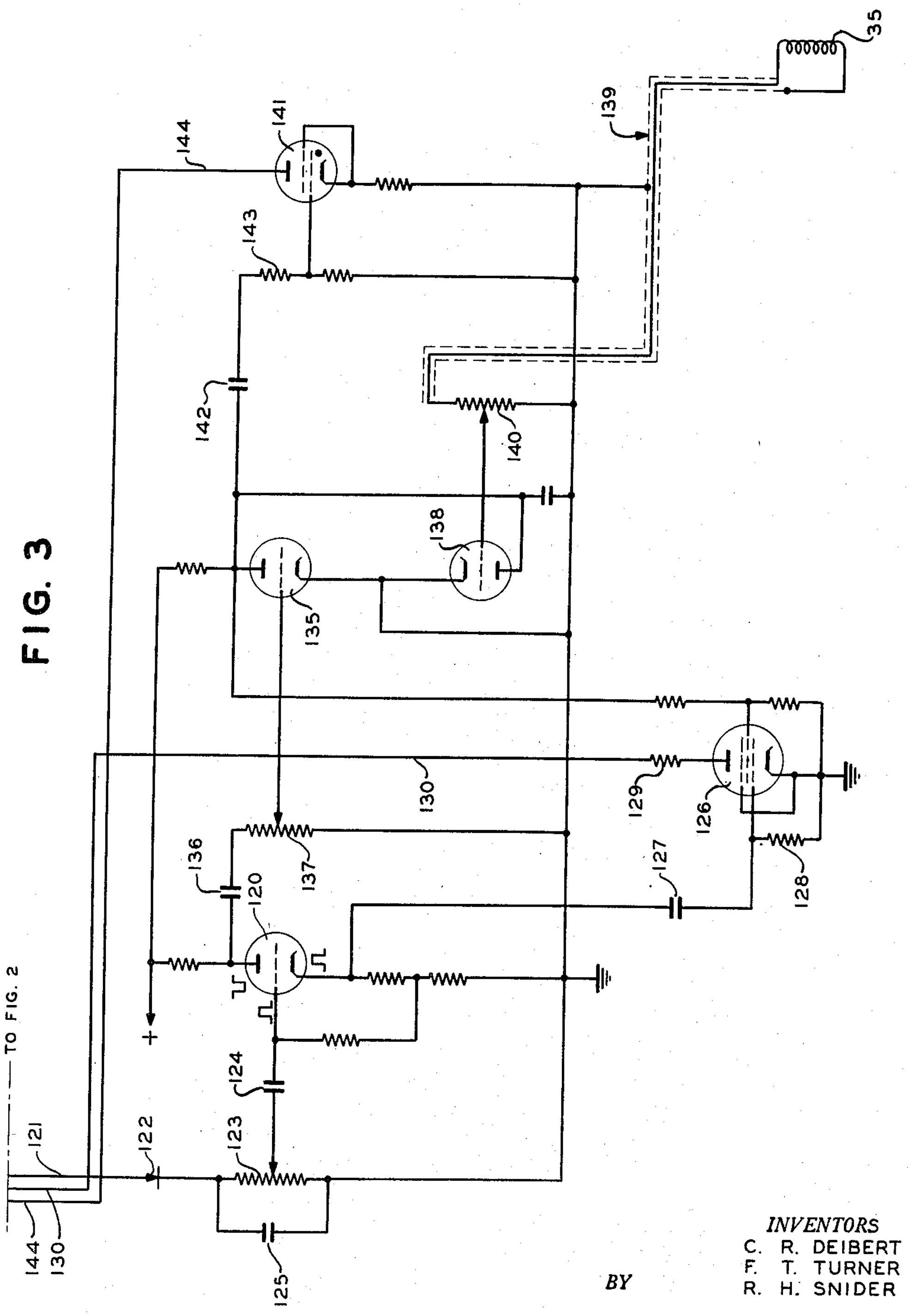

Tube 120 is connected as a phase inverter stage with substantiallly equal load resistances in the anode and cathode circuits. A negative going pulse appears at the anode of tube 120 and a positive going pulse appears at the cathode thereof, as shown in Fig. 3. The positive going pulse appearing at the cathode of tube 120 is applied to the control grid of a pentode tube 126 through a capacitor 127. A resistor 128 intercoupling the control grid of tube 126 and ground serves as a charging resistor for capacitor 127. The time constant of this charging circuit is adjusted so that capacitor 127 becomes charged after a succession of pulses and biases tube 126 to a point near cut off. The cathode of tube 126 is maintained at ground potential so that, in the absence of a charge on capacitor 127, tube 126 conducts strongly.

Figure 6:
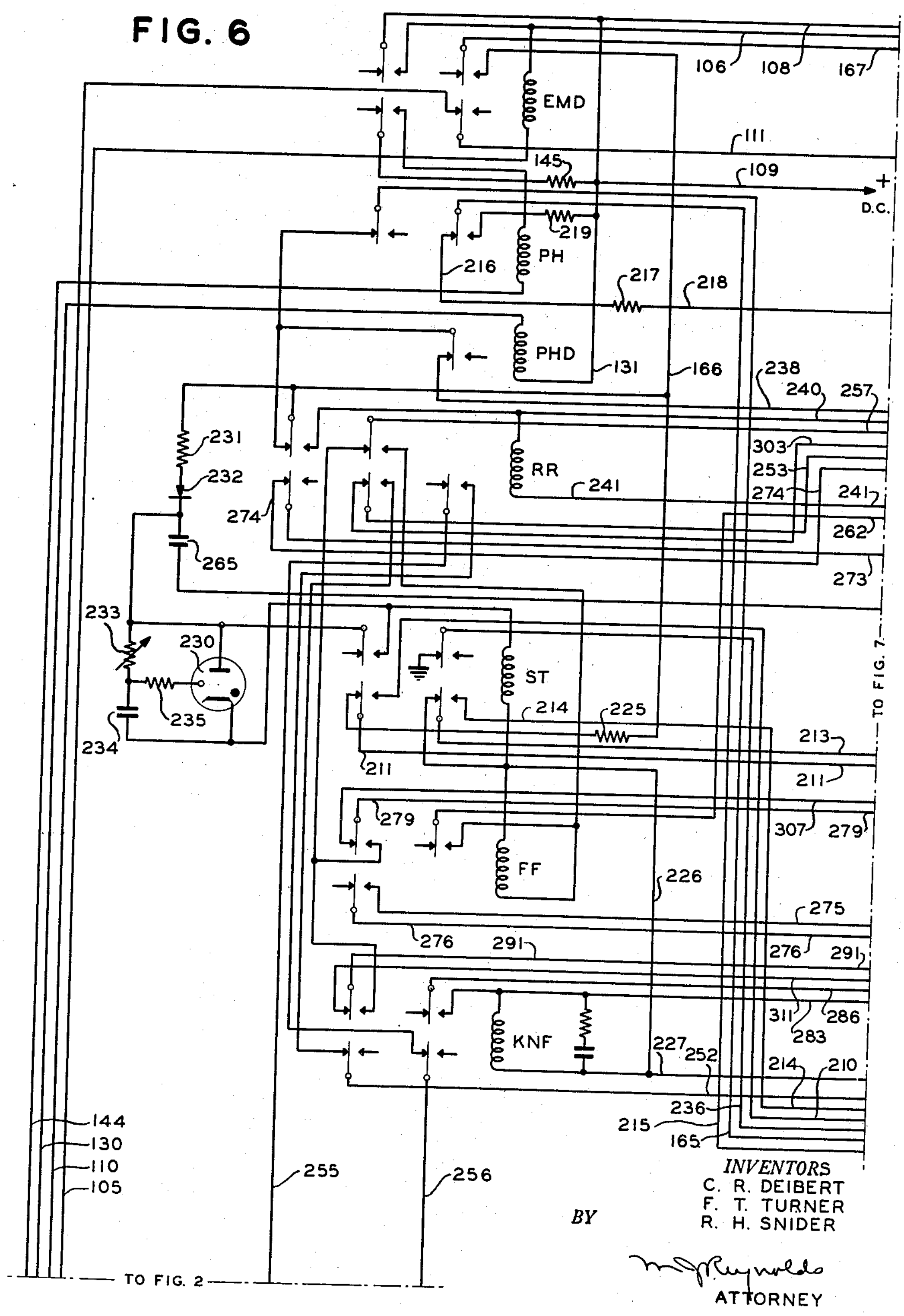

The anode of tube 126 is coupled to a source of positive operating potential through a circuit extending from the anode of tube 126 through a resistor 129, a conductor 130, the winding of a phasing signal detector relay PHD of Fig. 6, a conductor 131 and conductor 109 to the positive D. C. terminal. In the absence of received phasing pulses, the anode current of tube 126 is sufficiently high to maintain relay PHD energized. However, when phasing pulses are applied to the grid circuit of tube 126, the anode current thereof decreases to a point where it is insufficient to maintain relay PHD energized. Accordingly, relay PHD remains deenergized during substantially the entire phasing interval, i. e., the interval during which a phasing signal is received at the signal input terminal of transformer 50. The function of relay PHD will be described more fully hereinafter in connection with Figs. 6 and 7.

The negative going pulses appearing at the anode of tube 120, which pulses occur at a frequency of 30 cycles, are applied to the grid of a triode tube 135 through a coupling capacitor 136 and a gain control potentiometer 137. The train of pulses from tube 120 appear at the anode of tube 135 as a 30 cycle train of positive going pulses.

Referring for a moment to Fig. 1, it will be recalled that a negative going voltage pulse is induced in coil 35 of impulse generator 24 once each revolution of motor 20. Accordingly, the frequency of these pulses will be determined by the motor speed. Assuming a motor speed of 1800 R. P. M., the pulses will have a frequency of 30 cycles per second. In a manner to be pointed out hereinafter, during the phasing interval motor 20 is caused to rotate at 1830 R. P. M. so that the pulse frequency will be 30.5 cycles per second.

Impulse coil 35 is also shown in Fig. 3 and the negative going pulses generated therein are applied to the control grid of a triode tube 138 through a shielded cable 139 and a gain control potentiometer 140. This negative going pulse appears at the anode of tube 138 as a positive going pulse.

The anodes of tubes 135 and 138 are connected together and coupled to the control grid of a thyratron tube 141 through a capacitor 142 and a resistor 143. Thyratron 141 is biased so that it will not fire until the positive going pulse introduced into the grid circuit thereof is larger in magnitude than either of the positive going pulses appearing at the anodes of tubes 135 and 138. It is evident, therefore, that thyratron 141 will fire only when a pulse appearing at the anode of tube 135 is coincident for at least a portion of its cycle with a pulse appearing at the anode of tube 138, for only in this condition will the voltage on the grid of thyratron 141 be great enough to fire tube 141.

Due to the difference in frequency of the transmitted phasing pulses and the locally generated phasing pulses, the time required for coincidence varies between zero and a maximum of two seconds.

The anode circuit of thyratron 141 may be traced through a conductor 144, the winding of a phasing relay PH on Fig. 6, the lower-outer front contact and armature of relay EMD, a resistor 145 and through conductor 109 to the positive D. C. terminal. It is evident that when thyratron 141 is fired by coincidence of the phasing pulses, relay PH will be energized and will remain energized until the thyratron anode circuit is opened upon deenergization of relay EMD in response to an end-of-message signal as described hereinbefore. The function of relay PH will be set forth more fully hereinafter in connection with Figs. 4, 6 and 7.

In the facsimile transmitter described in the copending patent application of L. G. Pollard et al., referred to hereinbefore, a train of 30 cycle phasing pulses is generated for a predetermined time interval before transmission of a facsimile signal. The generation of each phasing pulse is controlled by a signal produced in response to scanning of a longitudinal gap in a roller transmitting blank. The local phasing pulses generated in the apparatus of Fig. 1 hereof are timed in accordance with the relative positions of the recording styluses and the recording copy sheet margin. When a locally generated phasing pulse and a transmitted phasing pulse occur at the same instant, the scanning apparatus of the transmitter and receiver are properly phased. It is evident that the narrower the phasing pulses, the more accurate will be the phasing achieved. However, as the pulses are made more narrow, the probability of their coinciding in a given time interval decreases. A long phasing interval is undesirable because the time consumed therein detracts from the time available for message transmission. In a preferred embodiment of the invention, satisfactory phasing was achieved with a phasing interval of 2.5 seconds and a phasing pulse width of approximately 0.5 millisecond. With this pulse width and a frequency difference of 0.5 cycle, the phasing interval could safely be set at two seconds rather than 2.5 seconds, the latter figure being selected to allow for variations in relay and timer adjustments.

Figure 4:
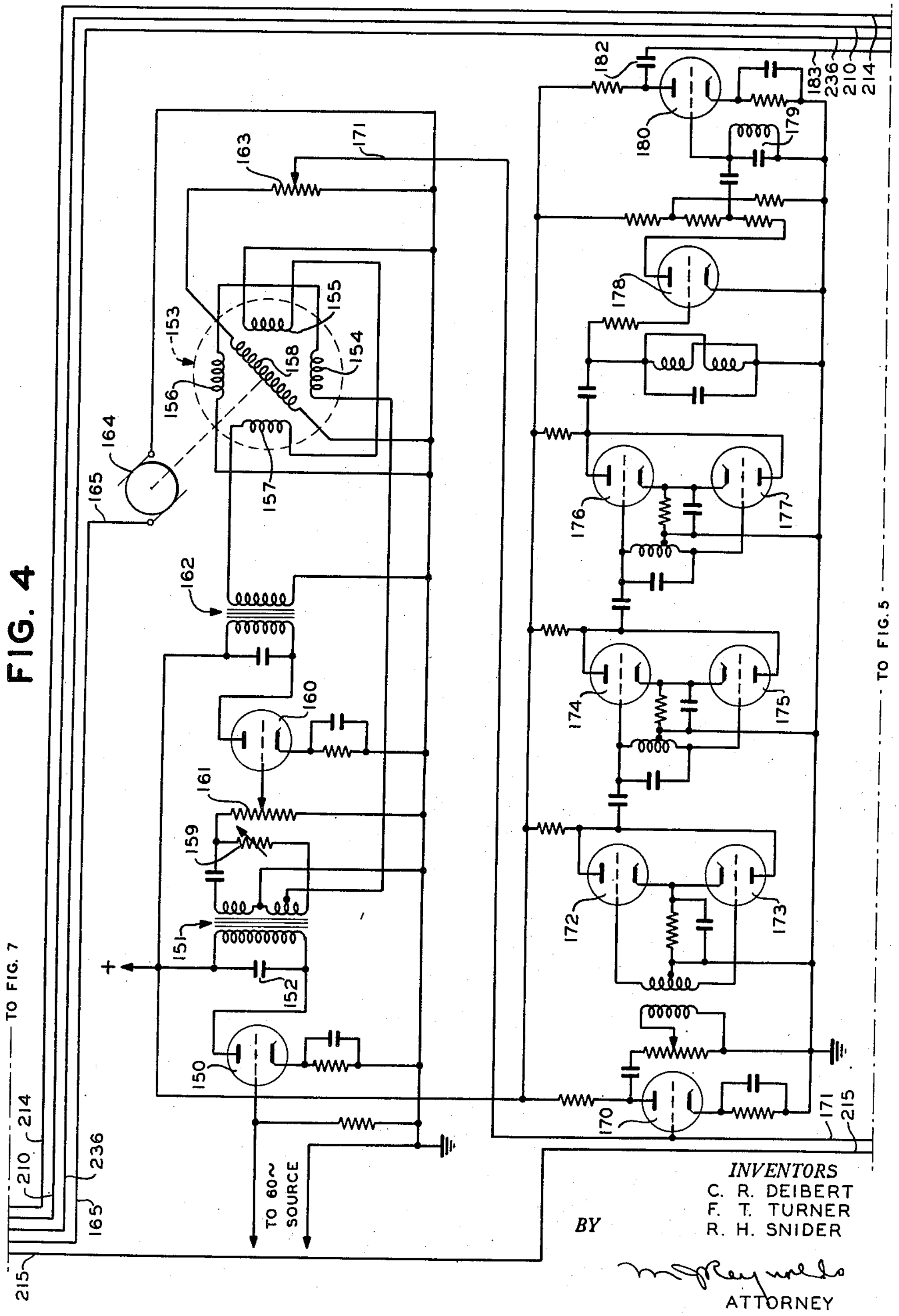

Referring now to Fig. 4, a 60 cycle sine wave signal from a frequency standard or other constant frequency source is applied to the control grid of an amplifier tube 150. The amplified 60 cycle signal appears across the primary winding of a transformer 151 in the anode circuit of tube 150. A capacitor 152 is shunted across the primary winding of transformer 151 to tune this winding to 60 cycles. The secondary winding of transformer 151 has a grounded center tap and an additional tap located so as to provide a signal substantially in phase quadrature with the signal appearing at the upper secondary winding terminal.

A rotary transformer 153 is provided with four quadrature spaced stationary primary windings 154, 155, 156 and 157 and a rotatable secondary winding 158. Opposite windings 154 and 156 of transformer 153 are connected in series between the additional tap on the secondary winding of transformer 151 and ground. A variable resistor 159 is shunted across the terminals of the secondary winding of transformer 151 to permit adjustment of the phase of the signal appearing at the additional tap.

The signal appearing at the upper terminal of the secondary winding of transformer 151 is applied to the control grid of an amplifier tube 160 through a gain control potentiometer 161. The output of tube 160 is applied to series connected windings 157 and 155 of transformer 153 through a coupling transformer 162. The currents flowing through the stationary windings of transformer 153 produce a rotating 60 cycle magnetic field. When rotor winding 158 of transformer 153 is stationary, a 60 cycle voltage is induced therein and appears across a potentiometer 163 shunted across the terminals thereof.

When rotor winding 158 is rotated by a motor 164, the frequency of the voltage induced in winding 158 is greater or lesser than 60 cycles in accordance with the direction of rotation and by an amount dependent on the speed of rotation. Assuming that rotor winding 158 is rotated at a speed of one cycle per second in the opposite direction as the rotating magnetic field set up by the stator windings, the induced voltage will have a frequency of 61 cycles.

One terminal of motor 164 is connected to ground. The other terminal thereof is connected to the high side of the 60 cycle A. C. mains through a circuit extending from the high terminal of motor 164 through a conductor 165, the outer armature and back contact of relay PH on Fig. 6, the upper-outer back contact and armature of a relay RR, a conductor 166, the upper inner front contact and armature of relay EMD, a conductor 167 and a conductor 168. It is evident that motor 164 will be energized when relay EMD is energized in response to termination of the end-of-message or standby signal and will remain energized until relay PH is energized by the firing of thyratron 141 in response to coincidence of a received and a locally generated phasing pulse. Accordingly, the frequency of the voltage induced in winding 158 and appearing across potentiometer 163 will be 61 cycles from the end of the end-of-message or standby signal until phasing is achieved, at which time the frequency is reduced to 60 cycles.

The tapping of potentiometer 163 is connected to the control grid of an amplifier tube 170 through a conductor 171. The output of tube 170 is applied to a first frequency doubler stage comprising tubes 172 and 173. The output of the first frequency doubler stage is applied to a second frequency doubler stage comprising tubes 174 and 175. The output of the second frequency doubler stage is applied to a third frequency doubler stage comprising tubes 176 and 177. The output of the third frequency doubler stage is applied to a frequency tripling stage comprising a tube 178. A parallel resonant circuit 179 in the anode circuit of tube 178 is tuned to 1440 cycles, which frequency is the 24th harmonic of 60 cycles and is the output frequency of tone generator 23 of Fig. 1 when motor 20 is rotating at 1800 R. P. M. While it is true that when the frequency appearing across potentiometer 163 is 61 cycles the frequency applied to circuit 179 will be 1460 cycles, this condition may be neglected because the motor stabilizer circuit is inoperative during this period.

Figure 5:
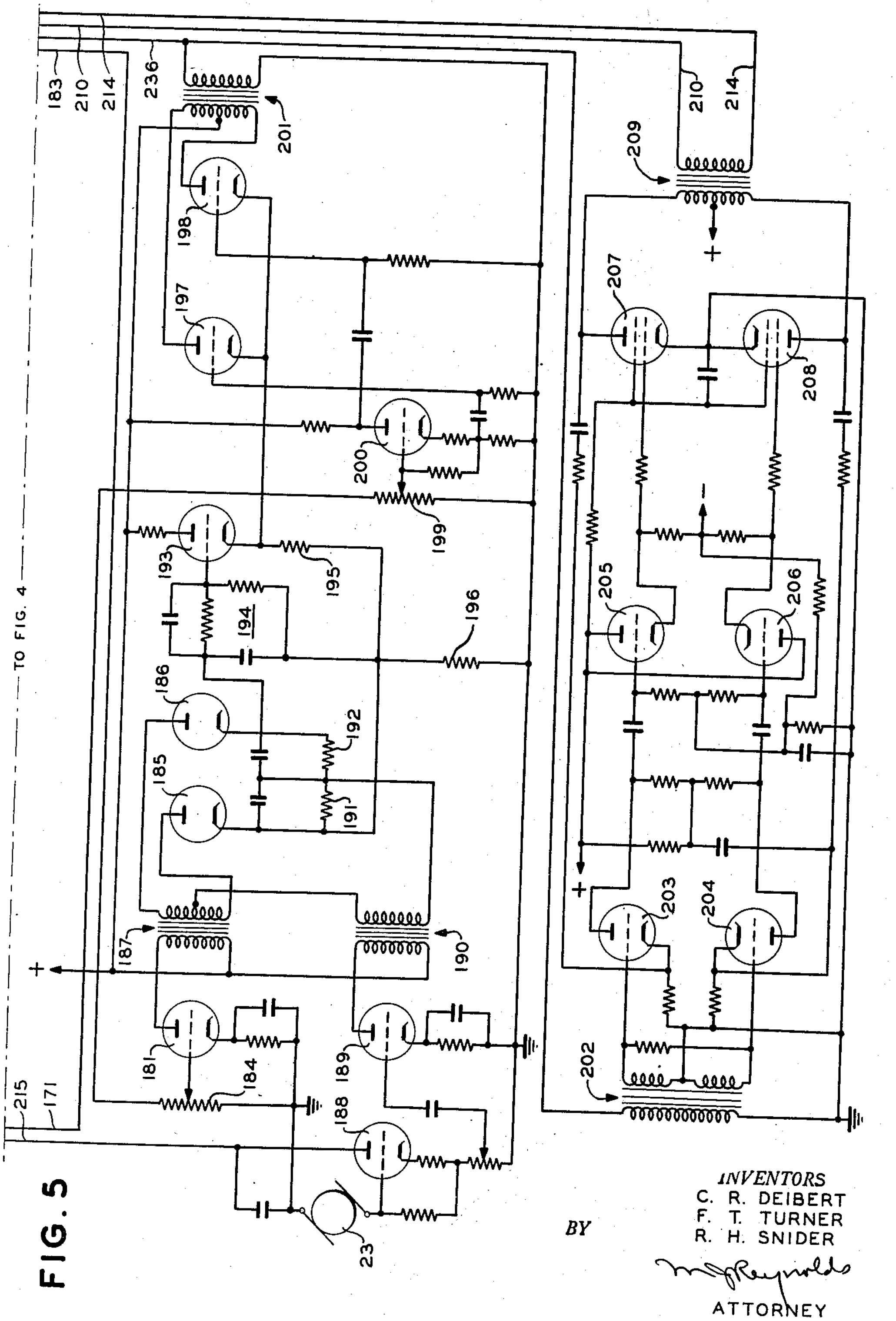

The 1440 cycle signal developed across tuned circuit 179 is amplified in an amplifier tube 180 and applied to the control grid of an amplifier tube 181, shown in Fig. 5, through a coupling capacitor 182, a conductor 183 and a potentiometer 184.

The circuits illustrated in Fig. 5 form part of a motor stabilizer circuit arrangement of the type described in the copending patent application of F. T. Turner et al., referred to hereinbefore, which application may be consulted for a complete explanation of the stabilizer theory of operation. It should be noted that the motor stabilizer circuit is included in the facsimile receiver circuit to minimize defects in the recorded copy produced by variations in instantaneous position of the stylus belt motor with respect to its rotating electric field. At low recording speeds these defects are not generally significant. At the high speeds contemplated in connection with the instant invention, these defects become highly objectionable.

The 1440 cycle signal at the anode of tube 181 is applied in phase opposition to the respective anodes of a pair of diodes 185 and 186 through a transformer 187.

Tone generator 23, shown in Figs. 1 and 5, produces a 1440 cycle signal when synchronous motor 20 is supplied with a 60 cycle driving voltage. This 1440 cycle signal is applied to the control grid of an amplifier tube 188. The output of tube 188, which is connected in cathode follower circuit arrangement, is amplified in a tube 189 and applied in phase coincidence to diodes 185 and 186 through a transformer 190.

Tubes 185 and 186 are connected in a phase detector circuit arranged to produce a net voltage across the output resistors 191 and 192 whenever the 1440 cycle signals depart from a quadrature relationship. The polarity of this net voltage, which may be termed an error voltage, depends on the sense of departure from quadrature phase relationship while the magnitude of the error voltage is proportional to the amount of the departure.

Since the phase of the 1440 cycle signal from tube 181 may be considered as proportional to the instantaneous position of the rotating field of motor 20, and the phase of the 1440 cycle signal from tube 189 may be considered as proportional to the instantaneous position of the rotor of motor 20, the error voltage is proportional to deviations in rotor instantaneous position relative to the rotating electric field.

The error voltage is applied to the control grid of a cathode follower amplifier tube 193 through a rate differentiating network 194. Tube 193 is biased so that the anode current thereof is proportional to the composite voltage applied to the grid thereof. This composite voltage contains a component proportional to the error voltage and a component proportional to the first derivative of the error voltage.

The anode current of tube 193 flows through resistors 195 and 196 in the cathode circuit thereof, thereby producing a bias voltage. Resistors 195 and 196 are also included in the cathode circuits of a pair of push-pull modulator tubes 197 and 198, so that the bias voltage produced by the anode current of tube 193 controls the gain of tubes 197 and 198.

The voltage from potentiometer 163 of Fig. 4 is also applied, through conductor 171 and a potentiometer 199, to the control grid of a phase inverting tube 200. The cathode and anode circuits of tube 200 are coupled, respectively, to the respective control grids of tubes 197 and 198 so that the 60 or 61 cycle voltage from potentiometer 163 is applied to tubes 197 and 198 in push pull relationship.

The output of the modulator stage comprising tubes 197 and 198 is applied, through an output transformer 201 and an input transformer 202, to a synchronous power amplifier. The synchronous power amplifier has three push-pull stages. The first amplifier stage comprises tubes 203 and 204. The second stage is a cathode coupled driver stage comprising tubes 205 and 206. The third stage is a power amplifier stage comprising tubes 207 and 208, the output of which is applied to the primary winding of an output transformer 209.

The secondary winding of transformer 209 is coupled through a relay circuit to stylus belt motor 20. The circuit therefor extends from the upper terminal of the secondary winding of transformer 209 through a conductor 210, the lower-outer front contact and armature of a relay ST on Fig. 6, a conductor 211, a normally closed emergency switch 212 on Fig. 7, the winding of stylus belt motor 20, a conductor 213, the lower-inner armature and front contact of relay ST and a conductor 214 to the lower terminal of the secondary winding of transformer 209. As will be explained more fully hereinafter, for a brief interval on starting, motor 20 is supplied with driving voltage from the A. C. mains rather than the synchronous power amplifier.

As described in the copending patent application of F. T. Turner et al., referred to hereinbefore, the gain of modulator tubes 197 and 198 is varied in accordance with the error voltage in a sense to compensate for the change in position of the rotor of motor 20 which gave rise to the error voltage. In this connection it must be remembered that the phase angle of a synchronous motor rotor can be varied by varying the magnitude of the driving voltage. Accordingly, a change in gain of tubes 197 and 198 produces a corresponding change in the driving voltage applied to motor 20. If a motor of a type other than synchronous were employed to drive the stylus belt, a modification of the motor stabilization means would be required. A suitable alternative arrangement employing an eddy current brake is illustrated in the said copending application of F. T. Turner et al.

As was pointed out hereinbefore, during the interval between the termination of the end-of-message or standby signal and completion of phasing, the operation of rotary transformer 153 produces a 61 cycle voltage across potentiometer 163. This 61 cycle voltage, when amplified in the synchronous power amplifier, causes motor 20 to operate at 1830 R. P. M. so that impulse generator 24 delivers 30.5 cycle pulses for comparison with the received 30 cycle pulses.

It is evident that the phase detector circuit can not operate properly while motor 20 is rotating at 1830 R. P. M. and that, if the control circuit is maintained operative during this period, rapid fluctuations in the motor driving voltage will result. Accordingly, the anode of tone generator amplifier tube 188 is returned to ground thereby disabling the motor stabilization circuit until phasing is complete. The circuit therefor extends from the anode of tube 188 through a conductor 215, the inner armature and back contact of relay PH, a conductor 216, a resistor 217, a conductor 218 and conductor 112 to a ground. When relay PH is operated by the firing of thyratron 141, a positive potential is applied to the anode of tube 188 through a circuit extending from the positive D. C. terminal on Fig. 6, through conductor 109, a resistor 219, the inner front contact and armature of relay PH and conductor 215 to the anode of tube 188.

Figure 7:
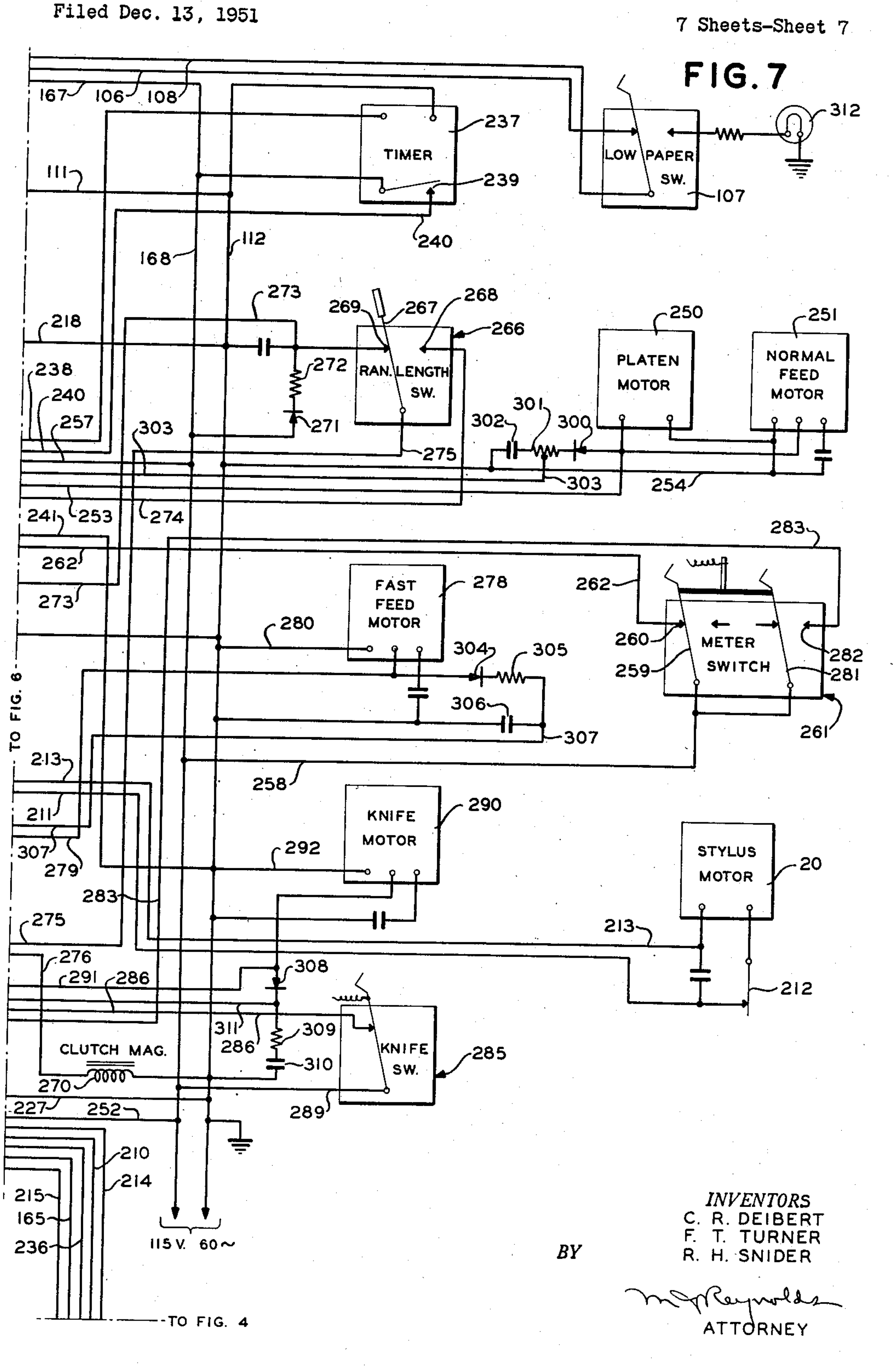

Referring now to Figs. 6 and 7, there are illustrated the relays and associated apparatus for controlling and operating the facsimile recorder of Fig. 1. Reference has been made hereinbefore to Figs. 6 and 7 for explaining the operation of certain of the electronic circuits of Figs. 2 through 5.

The recorder relay arrangement controls the starting and operation of the recorder, in accordance with the signals received from the transmitter, and comprises the end-of-message detector relay EMD, the phasing signal detector relay PHD, the phasing relay PH, a run relay RR, the motor start relay ST, a fast feed relay FF and a knife motor relay KNF. When the power is turned on and a standby signal received from the associated transmitter, all the relays except relay PHD are deenergized. Relay PHD is energized, as was pointed out hereinbefore, through a circuit extending from the positive D. C. terminal through conductor 109, conductor 131, the winding of relay PHD, conductor 130, resistor 129 and the discharge path of tube 126 on Fig. 3 to ground. It will be remembered that tube 126 is biased so as to conduct in the absence of a phasing pulse input. As was pointed out above, the received standby signal biases the end-of-message detector tube 99 of Fig. 2 in such a manner that its anode current is too low to energize relay EMD. When standby signal is removed from the line, the anode current of tube 99 is increased, thereby energizing relay EMD.

When relay EMD is energized, a starting circuit for stylus belt drive motor 20 is completed. This circuit extends from the high side of the A. C. line through conductor 168, conductor 167, the upper-inner armature and front contact of relay EMD, conductor 166, a current limiting resistor 225, the lower-outer back contact and armature of relay ST, conductor 211, normally closed switch 212, the winding of motor 20, conductor 213, the lower-inner armature and back contact of relay ST, a conductor 226, a conductor 227 and conductor 112 to ground. It is evident, therefore, that stylus belt drive motor 20 is started from the A. C. mains.

Energization of the relay EMD also applies power to a delay network included in the starter anode circuit of a glow discharge tube 230. The circuit therefor extends from the high side of the A. C. line through conductor 168, conductor 167, the upper-inner armature and front contact of relay EMD, conductor 166, a resistor 231, a rectifier 232, a variable resistor 233, a capacitor 234, the winding of relay ST, conductor 226, conductor 227 and conductor 112 to ground. The junction of resistor 233 and capacitor 234 is coupled to the starter anode of tube 230 through a resistor 235. After a predetermined time interval depending on the charging time constant for capacitor 234, the voltage thereacross rises to a value sufficiently high to fire tube 230. The main discharge path of tube 230 is connected across resistor 233 and capacitor 234 so that, when tube 230 fires, relay ST becomes energized through the charging circuit for capacitor 234 described above. The operations which take place upon energization of relay ST will be described below.

Energization of relay EMD also completes the energizing circuit for rotary transformer motor 164 of Fig. 4. This energizing circuit, which was described hereinbefore in connection with Fig. 4, extends through the the outer armature and back contact of relay PH and the upper-outer back contact and armature of relay RR. Rotation of motor 164 increases the output frequency of transformer 153 and hence increases the frequency of the input to the synchronous power amplifier of Fig. 5. As soon as stylus motor 20 is connected to the output of the synchronous power amplifier, this increased frequency will cause motor 20 to run above the synchronous speed corresponding to 60 cycles. In the example assumed, motor 20 would operate at 1830 R. P. M. rather than at its normal synchronous speed of 1800 R. P. M.

Connection of motor 20 to the synchronous power amplifier occurs upon energization of relay ST, as described above. It will be remembered that the terminals of stylus motor 20 are connected respectively to the lower armatures of relay ST. Since the lower front contacts of relay ST are connected through conductors 210 and 214, respectively, to synchronous power amplifier output transformer 209 on Fig. 5, energization of relay ST shifts motor 20 from the A. C. line to the synchronous power amplifier. The high side of the secondary winding of transformer 201 on Fig. 5, which transformer supplies the input signal to the synchronous power amplifier, is connected to ground through a conductor 236 and upper-inner armature and back contact of relay ST. As a result, there is no input to the synchronous power amplifier until this ground is removed by operation of relay ST.

It should be noted that when relay ST is energized, the main discharge path of tube 230 is shorted and relay ST locked up through its own upper-outer armature and front contact.

When a phasing signal is received from the transmitter, a bias voltage is developed at the grid of phasing signal detector tube 126 of Fig. 3. As described hereinbefore in connection with Fig. 3, the resulting reduction of anode current of tube 126 causes relay PHD to release.

When relay PHD releases, an energizing circuit for a timer 237 is completed. This circuit extends from the high side of the A. C. line through conductors 168 and 167, the upper-inner armature and front contact of relay EMD, conductor 166, the upper-outer armature and back contact of relay RR, the armature and back contact of relay PHD, a conductor 238, the winding of timer 237 and conductor 112 to ground. Timer 237 measures the phasing period and may be set to close contacts 237 thereof at any time duration between 2 and 2.5 seconds.

It will be remembered that during the first part of the phasing period, lasting until phasing is achieved, stylus belt motor 20 is operated at a speed of 1830 R. P. M. rather than 1800 R. P. M. Accordingly, the successive locally generated phasing pulses will be different in repetition rate with respect to the received phasing pulses. When coincidence of the pulses is achieved, thyratron 141 on Fig. 3 is fired, causing relay PH to operate. Operation of relay PH opens the energizing circuit for rotary transformer motor 164 at the outer armature of relay PH thereby stopping motor 164. The resulting cessation of rotation of rotor winding 158 of transformer 153 results in application of a 60 cycle voltage rather than a 61 cycle voltage to the synchronous power amplifier. Accordingly, stylus belt motor 20 will operate at its normal speed of 1800 R. P. M., and the stylus belt will be positioned properly relative to the transmitting blank at the transmitter. Energization of relay PH in response to a coincidence of phasing pulses will occur at some time during the phasing period between release of relay PHD and two seconds thereafter.

Until phasing is achieved, it is not desirable that the motor speed control circuit be operative. Accordingly, a positive operating potential is not applied to the anode of tone generator amplifier tube 188 until relay PH is energized. When relay PH is energized, the circuit is completed from the source of positive potential on Fig. 6 through conductor 109, resistor 219, the inner front contact and armature of relay PH and conductor 215 to the anode of tube 188.

At the end of the phasing period, as determined by adjustment of time 237, an energizing circuit for run relay RR is completed, the circuit extending from the high side of the A. C. line through conductor 168, contacts 239 of timer 237, a conductor 240, the winding of relay RR, a conductor 241 and conductor 112 to ground. When energized, relay RR locks up through a circuit extending from the high side of the A. C. line through conductors 168 and 167, the upper-inner armature and front contact of relay EMD, conductor 166, the upper-outer armature and front contact of relay RR, the winding of relay RR, and conductors 241 and 112 to ground. Timer 237 is deenergized and the contacts thereof opened when relay PHD is energized, which will occur intermittently during message transmission as received facsimile signals cause a reduction in the anode current of tube 126 of Fig. 3.

Operation of relay RR marks the close of the phasing period and the commencement of a message transmission interval. It is evident that the transmitter should be adjusted to commence message transmission at this time. This can be effected by providing a timer or other suitable device at the transmitter adjusted to initiate message transmission a predetermined time after commencing transmission of phasing pulses. This predetermined time is a time equal to or slightly greater than the operating time of timer 237 because timer 237 is energized upon receipt of transmitted phasing pulses and contacts 239 thereof close a given time thereafter to complete the energizing circuit for relay RR.

Operation of relay RR completes an energizing circuit for a platen advance motor 250 and a normal feed motor 251. This circuit extends from the high side of the A. C. line through conductor 168, a conductor 252, the lower-outer armature and back contact of relay KNF, the center-lower front contact and armature of relay RR, a conductor 253, the winding of platen motor 250, a conductor 254 and conductor 112 to ground. The operating winding of normal feed motor 251 is connected in parallel with the winding of platen motor 250. Platen advance motor 250 serves to maintain the recording copy sheet at the proper operating position relative to the recording styluses. Normal feed motor 251 serves to advance the recording copy sheet past the recording styluses at the proper rate relative to the scanning speed of the transmitter.

Energization of relay RR also closes the circuit of the primary winding of high voltage transformer 72 of Fig. 2, applying the high voltage to recording amplifier power supply 71 thereby providing operating potentials for the facsimile recording amplifier. The circuit of the primary winding of transformer 72 extends from one of the A. C. line terminals on Fig. 2 through the primary winding of transformer 72, a conductor 255, the lower-inner armature and front contact of relay RR, the lower-inner back contact and armature of relay KNF, and through a conductor 256 to the other A. C. line terminal on Fig. 2.

Energization of relay RR also energizes fast feed relay FF through a circuit extending from the high side of the A. C. line on Fig. 7 through conductor 168, a conductor 257, the upper-inner armature and front contact of relay RR, the winding of relay FF and conductors 226, 227 and 112 to ground. When energized, relay FF locks up through a circuit extending from the high side of the A. C. line through conductor 168, a conductor 258, tongue 259 and contact 260 of a meter switch 261, a conductor 262, the upper-inner armature and front contact of relay FF, the winding of relay FF and conductors 226, 227 and 112 to ground.

At the conclusion of the message, if it is to be immediately followed by another, an end-of-message signal consisting of a short pulse of 12.5 kc. tone is received. This end-of-message tone reduces the anode current of tube 99 in Fig. 2 in a manner described hereinbefore, causing end-of-message relay EMD to release and remain released during the duration of the end-of-message tone. Release of relay EMD breaks the locking circuit for run relay RR at the upper-inner armature and front contact of relay EMD, releasing relay RR.

Release of relay RR removes power from normal feed motor 251 and platen motor 250 at the lower-center armature and front contact of relay RR. Similarly, the primary circuit of the high voltage transformer of recording amplifier 71 is opened at the lower-inner armature and front contact of relay RR. Release of relay EMD also breaks the energizing circuit for relay PH at the lower-outer front contact and armature of relay EMD, thereby deionizing thyratron 141 of Fig. 3. In this manner thyratron 141 will be in readiness to phase the next transmission. When the energizing circuit for relay ST is opened at the upper-inner front contact and armature of relay EMD, a capacitor 265, which is connected in parallel with the winding of relay ST when relay ST is energized, makes relay ST slow-to-release and holds it up for the duration of the end-of-message tone, ensuring continued operation of stylus belt motor 20.

The operation of the paper feed and knife mechanisms after the end-of-message is determined by the setting of a single pole double throw switch 266. Switch 266, which is termed the random length switch, has a tongue 267, a random length contact 268 and a fixed length contact 269. If switch 266 is in the random length position, i. e., tongue 267 made with contact 268, power is applied to a paper feed meter clutch magnet 270 when the end-of-message tone is received, as indicated by the release of relay RR. The energizing circuit extends from the high side of the A. C. line through conductor 168, a rectifier 271, a resistor 272, a conductor 273, the lower outer armature and back contact of relay RR, a conductor 274, contact 268 and tongue 267 of switch 266, a conductor 275, the lower front contact and armature of relay FF, a conductor 276, clutch magnet 270 and conductor 112 to ground.

When energized, clutch magnet 270 causes a cam to engage with the roller or other device dispensing the message blank. After the desired amount of paper, as determined by the cam adjustment, has been fed out, the cam strikes and opens contact 260 and tongue 259 of switch 261. Suitable mechanical arrangements for the cam and other mechanical elements of Fig. 7 are described hereinafter in connection with Figs. 8 through 10.

It will be remembered that normal feed motor 251 was deenergized when relay RR was released in response to receipt of the end-of-message tone. Feeding of the message blank after release of relay RR is effected by a fast feed motor 278. Motor 278 operates at a higher rate of speed than motor 251 so that the time consumed in feeding out the message blank after the end of the message may be minimized. Motor 278 is energized through a circuit extending from the high side of the A. C. line through conductor 168, conductor 257, the upper-inner armature and back contact of relay RR, the upper-outer front contact and armature of fast feed relay FF, a conductor 279, the winding of fast feed motor 278, a conductor 280 and conductor 112 to ground.

When the cam opens contact 260 and tongue 259 of meter switch 261, it opens the locking circuit for relay FF. Release of relay FF in turn removes power from fast feed motor 278. When the cam operates switch 261, it also closes another tongue 281 and another contact 282 thereof, thus completing an energizing circuit for knife relay KNF. This circuit extends from the high side of the A. C. line through conductors 168 and 258, tongue 281 and contact 282, a conductor 283, the winding of relay KNF and conductors 227 and 112 to ground. When energized, relay KNF locks up through a circuit extending from the high side of the A. C. line through a conductor 289, a knife switch 285, a conductor 286, the upper-inner armature and front contact of relay KNF, the winding of relay KNF and conductors 227 and 112 to ground. This locking circuit is necessary because switch 261 will be operated for only a short time, it being released as the driving mechanism carries the cam on.

Figure 10:
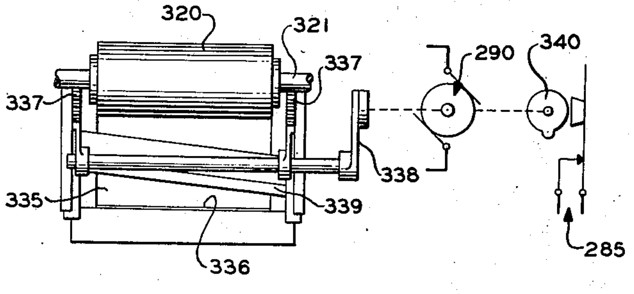

Energization of relay KNF completes an energizing circuit for a knife motor 290, the circuit extending from the high side of the A. C. line through conductors 168 and 257, the upper-inner armature and back contact of relay RR, the upper-outer front contact and armature of relay KNF, a conductor 291, the winding of knife motor 290, a conductor 292 and conductor 112 to ground. Knife motor 290 operates a knife blade, as illustrated in Fig. 10, to cut the message blank. As the knife blade completes its cycle after having cut the message blank, it opens switch 285, releasing relay KNF and removing power from knife motor 290.

If random length switch 266 is set in the fixed length position thereof, i. e., with tongue 267 made with contact 269, paper feed clutch magnet 270 is energized at the start of message reception, as indicated by energization of relay FF. The circuit therefor extends from the high side of the A. C. line through conductor 168, rectifier 271, resistor 272, contact 269 and tongue 267 of switch 266, conductor 275, the lower front contact and armature of relay FF, conductor 276, clutch magnet 270 and conductor 112 to ground. In this method of operation, the cam starts to meter the paper feed as soon as message recording begins. The cam may be adjusted to meter any desired length of message blank. When the end-of-message signal is received, the fast feed motor speeds up the message blank dispensing until the desired length of message blank has been dispensed, at which time the cam operates switch 282, shutting off the fast feed motor and initiating the knife cycle as before. It is evident that with switch 266 in its random position, a given length of message blank will be fed out after receipt of the end-of-message signal regardless of the actual length of the message. In the fixed length position of switch 266, a given length of message blank will be fed out, the proportion between the amount fed out by the normal feed motor and the amount fed out by the fast feed motor depending on the length of the message relative to the message blank length as determined by the cam setting. For example, if the cam is adjusted for a fixed length of eight inches, and a five inch message is received, the fast feed motor will feed out three more inches before the message blank is cut by the knife.

Upon completion of the end-of-message signal a phasing period for the succeeding message commences. It will be noted that this phasing period is contemporaneous with the cycle of operations involving the fast feed and knife motors. Upon completion of the end-of-message signal, relay EMD becomes energized, while relays PH and RR are deenergized. It will be remembered that with these relays in these conditions, the energizing circuit for rotary transformer motor 164 of Fig. 4 is completed. Accordingly, rotary transformer 153 will produce a 61 cycle output which, in turn, will cause stylus belt motor 20 to rotate at 1830 R. P. M., thereby causing the locally generated phasing pulses to be different in repetition rate from the received phasing pulses. The phasing operation will proceed, as described hereinbefore, until the transmitter and receiver are synchronized. At the end of the phasing period, as determined by the adjustment of timer 237, message recording will commence.

When a message is not to be succeeded by another message, a standby tone will be received instead of the end-of-message tone. The standby tone will hold relay EMD in its deenergized condition for a time interval sufficiently long for capacitor 265 to discharge, releasing relay ST. When relay ST releases, stylus belt motor 20 is disconnected from the synchronous power amplifier at the lower armatures and front contacts of relay ST. Motor 20 will not be connected to the A. C. line, however, since the circuit therefor includes the upper-inner front contact and armature of deenergized relay EMD. It will be noted that operation of the fast feed and knife motors is not dependent on whether an end-of-message or a standby tone is received. Hence the message blank will be fed out and cut off regardless of whether a succeeding message is to be received. When a succeeding message is not to be received, the circuit will return to its initial condition upon completion of the paper feed and cutting cycle. It will be remembered that in this initial condition a standby signal is being received and all motors and all relays except phasing detector relay PHD are deenergized.

It is desirable that each of platen motor 250, normal feed motor 251, fast feed motor 278 and knife motor 290 be stopped rapidly when power is removed therefrom. For this purpose, each of these motors is provided with a fast stopping circuit comprising a rectifier, a resistor and a capacitor. In the case of platen motor 250 and normal feed motor 251, the fast stopping circuit comprises a rectifier 300, a resistor 301 and a capacitor 302 connected in series circuit arrangement between the high sides of the windings of motors 250 and 251 and ground potential. A tapping on resistor 301 is connected to the high sides of the windings of motors 250 and 251 through a circuit extending from the tapping of resistor 301 through a conductor 303, the lower-center back contact and armature of run relay RR and through conductor 253 to the motor windings. It will be remembered that power from the A. C. line is applied to motors 250 and 251 when run relay RR is energized. A portion of this power is rectified by rectifier 300 and charges capacitor 302. When the motors are to be stopped, as indicated by release of relay RR, A. C. power is removed from motors 250 and 251 at the lower-center front contact of relay RR. Upon release of relay RR, the tapping of resistor 301 is connected to the high sides of the motor windings through the lower-center back contact of relay RR, allowing capacitor 302 to discharge through the motor windings. The flow of direct current from capacitor 302 through the motor windings provides the desired braking effect, rapidly bringing motors 250 and 251 to a halt.

A similar circuit is provided for fast feed motor 278 which, it will be remembered, must stop upon release of relay FF. This circuit comprises the series combination of a rectifier 304, a resistor 305 and a capacitor 306 intercoupling the high side of the fast feed motor winding and ground potential. The junction of resistor 305 and capacitor 306 is connected to the high side of the fast feed motor winding through a conductor 307, the upper-outer back contact and armature of relay FF and conductor 279. Accordingly, when relay FF releases, capacitor 306 will discharge through the fast feed motor winding, causing this motor to stop abruptly.

In the case of knife motor 290, the stopping circuit comprises the series combination of a rectifier 308, a resistor 309 and a capacitor 310 intercoupling the high side of the motor winding and ground potential. A conductor 311 interconnects the junction of resistor 309 and rectifier 308 and the upper-outer back contact of knife relay KNF. The associated armature and front contact are connected to the high side of the knife motor winding and the high side of the A. C. line, respectively. Accordingly, when relay KNF releases, capacitor 310 discharges through resistor 309 and the knife motor winding, thereby stopping the knife motor.

It will be noted that a third terminal of each of motors 251, 278 and 290 is coupled to ground through an associated capacitor. These capacitors are used in connection with split phase windings for starting these capacitor type motors.

It will be remembered that D. C. power is supplied to the tongue of low paper switch 107. This power is normally supplied through a back contact of switch 107 and conductor 106 to relay EMD and its associated apparatus. When the message blank supply becomes too low, the tongue of switch 107 is operated to its front or right hand contact, supplying power to an alarm light 312 and preventing power from being applied to relay EMD after the locking circuit therefor releases. In other words, after the end of the message during which the message blank supply has become too low, relay EMD will not operate to initiate a new recorder cycle.

Switch 107 is also shown in Fig. 8 together with a message blank roll 320 mounted on a shaft 321. A lever 322 mounted on a pivot 323 is held against roll 320 by a spring 324. When the supply of message blanks becomes too low, an arm 325 mounted on lever 322 causes the tongue of switch 107 to break with the back contact and make with the front contact.

Figure 9:
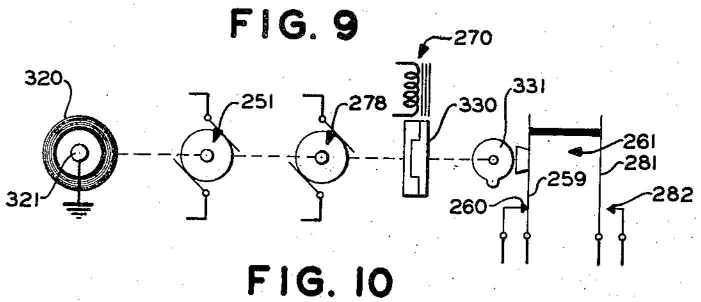
Figure 11:
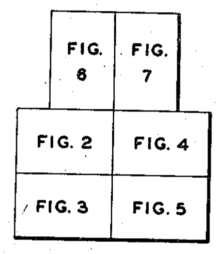
Fig. 11 illustrates the proper relative positioning of Figs. 2 through 7.

As shown in Fig. 9, shaft 321 may be rotated by either normal feed motor 251 or fast feed motor 278. A clutch mechanism 330, which is caused to engage at the proper time, as described hereinbefore, by clutch magnet 270, causes a cam 331 to rotate. At the proper time, cam 331 operates meter switch 261, deenergizing the fast feed motor and energizing the knife motor.

As illustrated in Fig. 10, the message blank 335 unrolls from roll 320 in a horizontal direction underneath the knife apparatus, rising vertically at edge 336. Knife motor 290 operates a rack and pinion assembly 337 through a crank 338, causing a knife blade 339 to advance and cut the message blank at 336. After cutting the message blank, the knife blade is returned to its rearward position. At the end of the knife blade travel, a cam 340 operated by knife motor 290 opens knife switch 285, thereby deenergizing the knife motor.

The operation of the relay circuits of Figs. 6 and 7 has been set forth in detail hereinbefore. In order to simplify the invention, a more brief description of the relay circuit operation will now be given.

When the standby signal is removed from the incoming line, relay EMD operates, applying A. C. power through contacts of relay ST to stylus belt motor 26. Power is applied at the same time to the delay network in the starter anode circuit of glow discharge tube 230. When the voltage across capacitor 234 rises to the required value, tube 230 conducts, energizing relay ST, which in turn closes a holding circuit shorting out tube 230. Operation of relay ST transfers stylus motor 20 to the output of the synchronous power amplifier and at the same time removes a short from the synchronous power amplifier input, allowing it to develop its normal output voltage to drive motor 20.

Operation of relay EMD also applies power through contacts on relays RR and PH to rotary transformer drive motor 164. Rotation of motor 164 increases the frequency of the input to the synchronous power amplifier to 61 cycles, causing motor 20 to run above normal speed as long as motor 164 is revolving.

When the phasing signal is received from the transmitter, a bias is developed at phasing signal detector tube 126, which reduces the anode current thereof to a low value and causes relay PHD to release. Release of relay PHD applies power to timer 237, which measures the desired phasing period. Since during this period the receiver is running at a different rate than the transmitter, the receiver will come into phase at some time during the phasing interval. When this occurs, thyratron 141 conducts, operating relay PH and deenergizing motor 164.

At the end of the phasing period, as determined by the timer setting, timer switch 239 is operated, operating run relay RR. Relay RR applies power to normal feed motor 251 and platen advance motor 250, closes the primary circuit of the high voltage transformer in the recording amplifier power supply and operates fast feed relay FF.

At the conclusion of the message, if it is to be immediately followed by another, an end-of-message signal is received, which momentarily releases relay EMD. Release of relay EMD breaks the holding circuit for relay RR, thereby releasing relay RR and applying power to fast feed motor 278 through contacts on relay RR.

The setting of the random length switch 266 determines the end-of-message operations as follows: If switch 266 is in its random length position, power is applied to clutch magnet 270 at the end of transmisison, and a predetermined length of message blank is fed out by the fast feed motor. A cam on the clutch then operates meter switch 261, releasing relay FF to stop the fast feed motor and applying power to knife relay KNF and knife motor 290. When the knife cycle is completed, switch 285 is opened, releasing relay KNF and stopping the knife motor.

If switch 266 is set for a fixed length, clutch magnet 270 is energized at the start of message transmission and the setting of cam 331 measures out the same length of message blank for each transmission.

Release of run relay RR also breaks the direct current supply to relay PH, deionizing thyratron 141 so that it will be ready to phase the next transmission. Relay ST is made slow-to-release so that the circuit will be ready for the next transmission.

When one transmission is not immediately followed by another, standby tone remains on the line and relay ST releases, removing power from stylus belt motor 20.

While the invention has been described in a specific embodiment thereof and in a specific use, it is not desired that it be limited thereto for obvious modifications thereof will occur to those skilled in the art without departing from the spirit and scope of the invention as set forth in the appended claims.

What is claimed is:

1. In a facsimile telegraph receiver adapted to respond to facsimile intelligence signals and phasing impulse signals from an associated transmitter, the combination comprising an input circuit for receiving said signals, a stylus mechanism for scanning a recording copy sheet, driving means for operating said stylus mechanism at a predetermined speed and for generating local phasing impulses at a rate proportional to the speed of said stylus mechanism, the frequency of said local phasing impulses being substantially equal to the frequency of said received phasing impulses when said stylus mechanism is operated at said predetermined speed thereof, means intercoupling said input circuit and said stylus mechanism to apply said received facsimile intelligence signals to said stylus mechanism, control means associated with said driving means and responsive to a received conditioning signal indication to vary the speed of said stylus mechanism thereby to render the frequency of said local phasing impulses different from the frequency of said received phasing impulses, means to compare said local and received phasing impulses and responsive to a predetermined time relationship therebetween to render said control means inoperative whereby said stylus mechanism is caused to operate at said predetermined speed thereof.

2. In a facsimile telegraph receiver adapted to respond to facsimile intelligence signals and phasing impulse signals from an associated transmitter, the combination comprising an input circuit for receiving said signals, a stylus mechanism for scanning a recording copy sheet, driving means for operating said stylus mechanism at a predetermined speed and for generating local phasing impulses at a rate proportional to the speed of said stylus mechanism, the frequency of said local phasing impulses being substantially equal to the frequency of said received phasing impulses when said stylus mechanism is operated at said predetermined speed thereof, means intercoupling said input circuit and said stylus mechanism to apply said received facsimile intelligence signals to said stylus mechanism, control means associated with said driving means and responsive to a received conditioning signal indication to vary the speed of said stylus mechanism thereby to render the frequency of said local phasing impulses different from the frequency of said received phasing impulses, means to compare said local and received phasing impulses and responsive to coincidence thereof to render said control means inoperative whereby said stylus mechanism is caused to operate at said predetermined speed thereof.

3. In a facsimile telegraph receiver adapted to respond to facsimile intelligence signals and phasing impulse signals from an associated transmitter, the combination comprising an input circuit for receiving said signals, a stylus mechanism for scanning a recording copy sheet, driving means including an electric motor and a source of voltage therefor for operating said stylus mechanism at a predetermined speed and for generating local phasing impulses at a rate proportional to the speed of said stylus mechanism, the frequency of said local phasing impulses being substantially equal to the frequency of said received phasing impulses when said stylus mechanism is operated at said predetermined speed thereof, means intercoupling said input circuit and said stylus mechanism to apply said received facsimile intelligence signals to said stylus mechanism, control means associated with said source of voltage and responsive to a received conditioning signal indication to vary the speed of said stylus mechanism thereby to render the frequency of said local phasing impulses different from the frequency of said received phasing impulses, means to compare said local and received phasing impulses and responsive to coincidence thereof to render said control means inoperative whereby said stylus mechanism is caused to operate at said predetermined speed thereof.

4. In a facsimile telegraph receiver adapted to respond to facsimile intelligence signals and phasing impulse signals from an associated transmitter, the combination comprising an input circuit for receiving said signals, a stylus mechanism for scanning a recording copy sheet, driving means including an alternating current motor and a source of alternating current voltage therefor for operating said stylus mechanism at a predetermined speed and for generating local phasing impulses at a rate proportional to the speed of said stylus mechanism, the frequency of said local phasing impulses being substantially equal to the frequency of said received phasing impulses when said stylus mechanism is operated at said predetermined speed thereof, means intercoupling said input circuit and said stylus mechanism to apply said received facsimile intelligence signals to said stylus mechanism, control means associated with said source of alternating current voltage and responsive to a received conditioning signal indication to vary the frequency of said alternating current voltage thereby to vary the speed of said stylus mechanism and to render the frequency of said local phasing impulses different from the frequency of said received phasing impulses, means to compare said local and received phasing impulses and responsive to coincidence thereof to render said control means inoperative whereby said stylus mechanism is caused to operate at said predetermined speed thereof.

5. In a facsimile telegraph receiver adapted to respond to facsimile intelligence signals and phasing impulse signals from an associated transmitter, the combination comprising an input circuit for receiving said signals, a stylus mechanism for scanning a recording copy sheet, driving means including a synchronous electric motor and a source of alternating current voltage therefor for operating said stylus mechanism at a predetermined speed and for generating local phasing impulses at a rate proportional to the speed of said stylus mechanism, the frequency of said local phasing impulses being substantially equal to the frequency of said received phasing impulses when said stylus mechanism is operated at said predetermined speed thereof, means intercoupling said input circuit and said stylus mechanism to apply said received facsimile intelligence signals to said stylus mechanism, control means including a rotary transformer intercoupling said source of alternating current and said electric motor and being responsive to a received conditioning signal indication to vary the frequency of said alternating current voltage thereby to vary the speed of said stylus mechanism and to render the frequency of said local phasing impulses different from the frequency of said received phasing impulses, means to compare said local and received phasing impulses and responsive to coincidence thereof to render said control means inoperative whereby said stylus mechanism is caused to operate at said predetermined speed thereof.

6. In a facsimile telegraph receiver adapted to respond to facsimile intelligence signals, phasing impulse signals and conditioning signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to a received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon achievement of a predetermined phase relationship between said received phasing impulses and said local phasing impulses, and means responsive to operation of said control circuit to disable said second electric motor whereby said first electric motor operates said scanning mechanism at said predetermined speed thereof.

7. In a facsimile telegraph receiver adapted to respond to facsimile intelligence signals, phasing impulse signals and conditioning signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to a received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, and means responsive to operation of said control circuit to disable said second electric motor whereby said first electric motor operates said scanning mechanism at said predetermined speed thereof.

8. In a facsimile telegraph receiver adapted to respond to facsimile intelligence signals, phasing impulse signals and conditioning signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a primary winding coupled to said source of alternating current power and arranged to generate a rotating magnetic field and a secondary winding coupled to said first electric motor, one of said windings being rotatable, a second electric motor arranged to rotate said rotatable winding, means responsive to a received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, and means responsive to operation of said control circuit to disable said second electric motor whereby said first electric motor operates said scanning mechanism at said predetermined speed thereof.

9. In a facsimile telegraph receiver adapted to respond to facsimile intelligence signals, phasing impulse signals and conditioning signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer intercoupling said source of alternating current power and said first electric motor and having a stationary primary winding arranged to generate a rotating magnetic field and a rotatable secondary winding, a second electric motor arranged to rotate said secondary winding, means responsive to a received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, and means responsive to operation of said control circuit to disable said second electric motor whereby said first electric motor operates said scanning mechanism at said predetermined speed thereof.

10. In a facsimile telegraph receiver adapted to respond to facsimile intelligence signals, phasing impulse signals and standby signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, a first control circuit including a thermionic discharge tube having a control grid coupled to said input circuit whereby the anode current thereof is varied by a received standby signal and relay means included in the anode circuit of said discharge tube, said first control circuit being responsive to termination of said received standby signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a second control circuit coupled to said comparison circuit and arranged to operate upon coincidence of a received phasing impulse and a local phasing impulse, and means responsive to operation of said second control circuit to disable said second electric motor whereby said first electric motor operates said scanning mechanism at said predetermined speed thereof.

11. In a facsimile telegraph receiver adapted to respond to sequentially received facsimile intelligence signals, phasing impulse signals and conditioning signals from an associated transmitter, the combination comprising an input circuit for receiving said signals, a stylus mechanism for scanning a recording copy sheet, an amplifier circuit intercoupling said input circuit and said scanning mechanism thereby to apply said received facsimile intelligence signals to said scanning mechanism, control means for disabling said amplifier circuit except when said facsimile intelligence signals are applied to said input circuit thereby to suppress spurious marking of said recording copy sheet, a first electric motor for operating said stylus mechanism, generating means coupled to said first electric motor for producing local phasing impulses at a rate proportional to the speed of said stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to a received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, and means responsive to operation of said control circuit to disable said second electric motor whereby said first electric motor operates said scanning mechanism at said predetermined speed thereof.

12. Apparatus for phasing a facsimile receiver stylus mechanism with an associated transmitter as represented by a train of received phasing impulses, comprising generating means for generating a train of local phasing impulses, each local phasing impulse occurring at a time correlated with a predetermined position of said stylus mechanism, a first electric motor for operating said stylus mechanism and said generating means, a source of alternating current having a frequency at which said first electric motor operates said stylus mechanism at a predetermined speed and said generating means produces local phasing impulses having a frequency substantially equal to the frequency of said received phasing impulses, a transformer having a rotatable winding and intercoupling said source and said first electric motor, a second electric arranged to rotate said rotatable winding whereby said first electric motor operates said stylus mechanism at a speed other than said predetermined speed and said generating means produces local phasing impulses having a frequency different from the frequency of said received phasing impulses, means for comparing the phase of said received phasing impulses and said local phasing impulses, and means responsive to achievement of a predetermined phase relation between said received phasing impulses and said local phasing impulses for disabling said second electric motor whereby said first electric motor operates said stylus mechanism at said predetermined speed thereof.

13. Apparatus for phasing a facsimile receiver stylus mechanism with an associated transmitter as represented by a train of received phasing impulses, comprising generating means for generating a train of local phasing impulses, each local phasing impulse occurring at a time correlated with a predetermined position of said stylus mechanism, a first electric motor for operating said stylus mechanism and said generating means, a source of alternating current having a frequency at which said first electric motor operates said stylus mechanism at a predetermined speed and said generating means produces local phasing impulses having a frequency substantially equal to the frequency of said received phasing impulses, a transformer having a plurality of quadrature spaced primary windings and having a rotatable secondary winding coupled to said first electric motor, phase splitting means intercoupling said source and said primary windings thereby to produce a rotary magnetic field in said transformer, a second electric motor arranged to rotate said rotatable winding thereby to vary the frequency of the power applied to said first electric motor whereby said first electric motor operates said stylus mechanism at a speed other than said predetermined speed and said generating means produces local phasing impulses having a frequency different from the frequency of said received phasing impulses, means for comparing the phase of said received phasing impulses and said local phasing impulses, and means responsive to coincidence of a received phasing impulse and a local phasing impulse for disabling said second electric motor whereby said first electric motor operates said stylus mechanism at said predetermined speed thereof.

14. Apparatus for phasing a facsimile receiver stylus mechanism with an associated transmitter as represented by a train of received phasing impulses, comprising generating means for generating a train of local phasing impulses, each local phasing impulse occurring at a time correlated with a predetermined position of said stylus mechanism and said generating means, a source of alternating current having a frequency at which said first electric motor operates said stylus mechanism at a predetermined speed and said generating means produces local phasing impulses having a frequency substantially equal to the frequency of said received phasing impulses, a transformer having a rotatable winding and intercoupling said source and said first electric motor, a second electric motor arranged to rotate said rotatable winding whereby said first electric motor operates said stylus mechanism at a speed other than said predetermined speed and said generating means produces local phasing impulses having a frequency different from the frequency of said received phasing impulses, a normally nonconductive gaseous discharge tube, a relay having an energizing circuit including the main discharge path of said tube, means to apply said received phasing impulses and said local phasing impulses to said tube thereby to fire said tube and energize said relay upon coincidence of a received phasing impulse and a local phasing impulse, and means coupled to said relay and responsive to energization thereof to disable said second electric motor whereby said first electric motor operates said stylus mechanism at said predetermined speed thereof.

15. In a facsimile telegraph receiver adapted to respond to sequentially received conditioning signals, phasing impulse signals and facsimile intelligence signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of the stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to a first received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, means responsive to operation of said control circuit to disable said second electric motor whereby said first electric motor operates said scanning mechanism at said predetermined speed thereof, timing means operative upon application of received phasing impulse signals to said input circuit for measuring a predetermined phasing period, third and fourth electric motors for selectively advancing said recording copy sheet past said stylus mechanism at different rates of speed, means operative at the end of said predetermined phasing period to energize said third electric motor, means responsive to a second conditioning signal to deenergize said third electric motor and to energize said second and fourth electric motors, and means operative a predetermined time interval after receipt of said second conditioning signal to deenergize said fourth electric motor.

16. In a facsimile telegraph receiver adapted to respond to sequentially received conditioning signals, phasing impulse signals and facsimile intelligence signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of the stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to a first received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, means responsive to operation of said control circuit to disable said second electric motor whereby said first electric motor operates said scanning mechanism at said predetermined speed thereof, timing means operative upon application of received phasing impulse signals to said input circuit for measuring a predetermined phasing period, third and fourth electric motors for selectively advancing said recording copy sheet past said stylus mechanism at relatively low and relatively high rates of speed, respectively, means operative at the end of said predetermined phasing period to energize said third electric motor, means responsive to a second conditioning signal to deenergize said third electric motor and to energize said second and fourth electric motors, and means operative a predetermined time interval after receipt of said second conditioning signal to deenergize said fourth electric motor.

17. In a facsimile telegraph receiver adapted to respond to sequentially received conditioning signals, phasing impulse signals and facsimile intelligence signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of the stylus mechanism, a source of alternating current power having a frequency at which said first electric motor will operate said stylus mechanism at a predetermined rate and at which the frequency of said local phasing impulses will be substantially equal to the frequency of said received phasing impulses, a transformer having a primary winding arranged to produce a rotating magnetic field and having a rotatable secondary winding and intercoupling said source of alternating current power and said first electric motor, a second electric motor arranged to rotate said rotatable winding, means including a first electron discharge tube and a first associated relay circuit and being responsive to a first received conditioning signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, said control circuit including a thyratron tube and a second associated relay circuit, means responsive to operation of said control circuit to disable said second electric motor whereby said first electric motor operates said scanning mechanism at said predetermined speed thereof, timing means operative upon application of received phasing impulse signals to said input circuit for measuring a predetermined phasing period, said timing means including a second electron discharge tube, a third normally deenergized associated relay circuit and a timing mechanism coupled to said third relay circuit and responsive to deenergization thereof to measure said period, third and fourth electric motors for selectively advancing said recording copy sheet past said stylus mechanism at different rates of speed, means operative at the end of said predetermined phasing period to energize said third electric motor, means responsive to a second conditioning signal to deenergize said third electric motor and to energize said second and fourth electric motors, and means operative a predetermined time interval after receipt of said second conditioning signal to deenergize said fourth electric motor.

18. In a facsimile telegraph receiver adapted to respond to sequentially received standby signals, phasing impulse signals and facsimile intelligence signals from an associated transmitter, the combination comprising an input circuit for receiving said signals, a stylus mechanism coupled to said input circuit and arranged to scan a recording copy sheet, a first electric motor for operating said stylus mechanism, generating means coupled to said first electric motor for producing local phasing impulses at a rate proportional to the speed of the stylus mechanism, a source of alternating current power having a frequency at which said first electric motor will operate said stylus at a predetermined rate and at which the frequency of said local phasing impulses will be substantially equal to the frequency of said received phasing impulses, a transformer having a rotatable winding and intercoupling said source of alternating current power and said first electric motor, a second electric motor arranged to rotate said rotatable winding, means responsive to termination of a first received standby signal to energize said second electric motor thereby to cause said first electric motor to operate said stylus mechanism at a speed other than said predetermined speed and said generating means to produce local phasing impulses having a frequency different from the frequency of said received phasing impulses, means to demodulate said received phasing impulse signals thereby to produce a train of received phasing impulses, a comparison circuit, means to apply said received phasing impulses and said local phasing impulses to said comparison circuit, a control circuit coupled to said comparison circuit and arranged to operate upon coincidence of a received phasing impulse and a local phasing impulse, means responsive to operation of said control circuit to disable said second electric motor whereby said first electric motor operates said scanning mechanism at said predetermined speed thereof, timing means operative upon application of received phasing impulse signals to said input circuit for measuring a predetermined phasing period, third and fourth electric motors for selectively advancing said recording copy sheet past said stylus mechanism at different rates of speed, means operative at the end of said predetermined phasing period to energize said third electric motor, means responsive to a second received standby signal to deenergize said third electric motor and to energize said fourth electric motor, means operative a predetermined time interval after receipt of said second received standby signal to deenergize said fourth electric motor, means responsive to termination of said second received standby signal to energize said second electric motor, and means responsive to continuation of said second received standby signal beyond a predetermined time interval to deenergize said first electric motor.

References Cited in the file of this patent

UNITED STATES PATENTS

| | | |
|---|---|---|
| 2,355,369 | Finch | Aug. 8, 1944 |
| 2,393,329 | Mample | Jan. 22, 1946 |
| 2,396,705 | Khalil | Mar. 19, 1946 |
| 2,469,423 | Wise | May 10, 1949 |
| 2,503,311 | Wise | Apr. 11, 1950 |
| 2,511,837 | D'Humy | June 20, 1950 |
| 2,522,919 | Artzt | Sept. 19, 1950 |
| 2,530,516 | Finch | Nov. 21, 1950 |
| 2,556,970 | McFarlane | June 12, 1951 |